(12) United States Patent  
Gibson et al.

(10) Patent No.: US 8,894,544 B2
(45) Date of Patent: *Nov. 25, 2014

(54) AUTOMATIC TRANSMISSION SHIFT CONTROL BASED ON TRANSMISSION INPUT SHAFT TORQUE SIGNAL

(71) Applicant: Ford Global Technologies, LLC, Dearborn, MI (US)

(72) Inventors: Alexander O'Connor Gibson, Ann Arbor, MI (US); Seung-Hoon Lee, Northville, MI (US); Yuji Fujii, Ann Arbor, MI (US); Gregory Michael Pietron, Canton, MI (US); Diana Yanakiev, Birmingham, MI (US); Joseph F. Kucharski, Livonia, MI (US); Nimrod Kapas, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 21 days.

This patent is subject to a terminal disclaimer.

(21) Appl. No.: 13/798,456

(22) Filed: Mar. 13, 2013

(65) Prior Publication Data

US 2014/0274555 A1 Sep. 18, 2014

(51) Int. Cl.
*B60W 10/04* (2006.01)
*B60W 10/11* (2012.01)
*B60W 10/02* (2006.01)
*B60W 10/06* (2006.01)

(52) U.S. Cl.
CPC .............. *B60W 10/11* (2013.01); *B60W 10/02* (2013.01); *B60W 10/06* (2013.01)
USPC ........................................................ 477/107

(58) Field of Classification Search
USPC ........................... 477/107, 102, 101; 475/266
See application file for complete search history.

(56) References Cited

U.S. PATENT DOCUMENTS

| 4,593,580 | A | * | 6/1986 | Schulze | 477/109 |
| 4,653,621 | A | * | 3/1987 | Oshiage | 477/175 |
| 5,188,005 | A | | 2/1993 | Sankpal et al. | |
| 5,319,555 | A | * | 6/1994 | Iwaki et al. | 701/57 |
| 6,047,605 | A | | 4/2000 | Garshelis | |
| 6,145,387 | A | | 11/2000 | Garshelis | |
| 6,269,293 | B1 | | 7/2001 | Correa et al. | |
| 6,490,934 | B2 | | 12/2002 | Garshelis | |
| 6,553,847 | B2 | | 4/2003 | Garshelis | |
| 6,846,260 | B2 | | 1/2005 | Horiuchi | |

(Continued)

FOREIGN PATENT DOCUMENTS

JP 05087227 4/1993

*Primary Examiner* — Dirk Wright
(74) *Attorney, Agent, or Firm* — James Bottavio; Brooks Kushman P.C.

(57) ABSTRACT

A system and method for minimizing torque disturbances during a shift event for an automatic transmission control actual transmission input shaft torque using a transmission input shaft signal produced by an input shaft torque sensor. The torque sensor provides a signal to a controller that monitors the measured transmission input torque. The torque sensor may be implemented by a strain gauge, a piezoelectric load cell, or a magneto-elastic torque sensor. The system may include a vehicle powertrain having an engine, a transmission coupled to the engine via a torque converter, an input torque sensor coupled to the input shaft of the transmission and a controller configured to control engine torque to cause the measured transmission input shaft torque to achieve a target transmission input shaft torque during the shift event.

20 Claims, 4 Drawing Sheets

(56) References Cited

U.S. PATENT DOCUMENTS

| | | |
|---|---|---|
| 6,991,584 B2 | 1/2006 | Cowan |
| 7,247,126 B2 * | 7/2007 | Shim et al. .................... 477/148 |
| 7,261,671 B2 | 8/2007 | Ortmann et al. |
| 7,313,470 B2 | 12/2007 | Zaremba et al. |
| 7,331,899 B2 | 2/2008 | Ortmann et al. |
| 7,351,183 B2 | 4/2008 | Fujii et al. |
| 7,503,875 B2 | 3/2009 | Fujii et al. |
| 8,290,666 B2 * | 10/2012 | Turski et al. .................... 701/48 |
| 8,738,254 B2 * | 5/2014 | Lee et al. ........................ 701/58 |
| 2004/0186645 A1 | 9/2004 | Kohno et al. |
| 2009/0118936 A1 | 5/2009 | Heap et al. |
| 2010/0318269 A1 | 12/2010 | Yanakiev et al. |

\* cited by examiner

AUTOMATIC TRANSMISSION SHIFT CONTROL BASED ON TRANSMISSION INPUT SHAFT TORQUE SIGNAL

TECHNICAL FIELD

The present disclosure relates to shift control of a multiple-ratio automatic transmission based on a transmission input shaft torque signal.

BACKGROUND

A multiple-ratio automatic transmission in an automotive vehicle powertrain utilizes multiple friction elements for automatic gear ratio shifting. In general, these friction elements may be described as torque establishing elements although more commonly they are referred to as clutches or brakes. The friction elements establish power flow paths from a torque source such as an internal combustion engine or a traction motor to vehicle traction wheels. During acceleration of the vehicle, the overall speed ratio, which is the ratio of a transmission input shaft speed to a transmission output shaft speed, is reduced as vehicle speed increases for a given accelerator pedal demand as the transmission upshifts through the various ratios.

In the case of a synchronous upshift, a first torque establishing element, referred to as an off-going clutch (OGC), is released while a second torque establishing element, referred to as an on-coming clutch (OCC), is engaged to lower a transmission gear ratio and change the torque flow path through the transmission. A typical upshift event is divided into a preparatory phase, a torque phase, and an inertia phase. During the preparatory phase, the OCC is stroked to prepare for its engagement while the OGC torque-holding capacity is reduced as a step toward its release. During the torque phase, which may be referred to as a torque transfer phase, the OGC torque is reduced toward a value of zero or a non-significant level to prepare it for disengagement. Simultaneously, the OCC torque is raised from a non-significant level, thereby initiating engagement of the OCC according to a conventional upshift control strategy. The timing of the OCC engagement and the OGC disengagement results in a momentary activation of two torque flow paths through the gearing, thereby causing torque delivery to drop momentarily at the transmission output shaft. This condition, which can be referred to as a "torque hole," occurs before disengagement of the OGC. A vehicle occupant can perceive a "torque hole" as an unpleasant shift shock. When the OCC develops enough torque, the OGC is released, marking the end of the torque phase and the beginning of the inertia phase. During the inertia phase, the OCC torque is adjusted to reduce its slip speed toward zero. When the OCC slip speed reaches zero, the shift event is completed.

In a synchronous shift, the timing of the OGC release should be synchronized with the OCC torque level to deliver a consistent shift feel. Mismatched control timings between OCC and other torque-generating devices result in inconsistent shift quality or a perceivable shift shock. As such, there is a need to provide a robust and systematic means to reduce torque disturbances transmitted from the powertrain to the vehicle body during an upshift event.

SUMMARY

A system and method for reducing torque disturbances during a shift event for an automatic transmission control measured transmission input shaft torque using a transmission input shaft signal produced by an input shaft torque sensor. In particular, actual transmission input shaft torque is controlled or compensated, based on measured transmission input torque, by controlling a torque source, such as engine torque. Typically, transmission input torque in an automatic transmission is represented by torque converter output resulting from engine torque input. Embodiments of this disclosure may be used in various shift control applications where improvement in shift quality is desired.

In one embodiment, a vehicle powertrain includes an engine, a transmission having an input shaft coupled to the engine by a torque converter where the transmission has a gear set defining multiple torque flow paths from the input shaft to the output shaft of the transmission and an input torque sensor coupled to the input shaft. The vehicle powertrain also includes a controller configured to control engine torque to cause a measured transmission input shaft torque to achieve a target transmission input shaft torque during at least a portion of a shift event, which includes a preparatory phase, a torque phase and an inertia phase.

In another embodiment, a method for controlling a vehicle having a transmission includes controlling engine torque to cause a measured transmission input shaft torque to achieve a target transmission input shaft torque during a shift event characterized by a preparatory phase followed by a torque phase and an inertia phase. The measured transmission input shaft torque may be based on an input shaft torque signal produced by the input torque sensor. The torque sensor may be implemented by a strain gauge, a piezoelectric load cell, or a magneto-elastic torque sensor. The method may also include controlling hydraulic pressure applied to an on-coming clutch (OCC) during the preparatory phase of the shift event to prepare for engagement of the OCC, reducing torque capacity of an off-going clutch (OGC) during the preparatory phase to prepare for disengagement of the OGC and increasing an engine torque reserve to a predetermined level during the preparatory phase. Embodiments may further include terminating engine torque control in response to end of at least one of the torque phase and the inertia phase.

Embodiments according to the present disclosure provide various advantages. For example, various embodiments reduce torque disturbances transmitted from the powertrain to the vehicle body, which reduces the unpleasant shift shock experienced by drivers. Use of the measured transmission input shaft torque signal may also facilitate coordinated torque phase control and inertia phase control of an on-coming clutch, off-going clutch, and input torque source(s) in a synchronized manner during shifting.

The above advantages and other advantages and features will be readily apparent from the following detailed description of the preferred embodiments when taken in connection with the accompanying drawings.

DETAILED DESCRIPTION

As required, detailed embodiments of the claimed subject matter are disclosed herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments of the claimed subject matter.

The shifting of a multiple-ratio automatic transmission is accompanied by applying and/or releasing multiple friction elements (such as plate clutches, band-brakes, etc.) that change speed and torque relationships by altering gear configurations. Friction elements may be actuated hydraulically, mechanically or through other strategies using one or more associated actuators that may be in communication with a microprocessor-based controller implementing a particular control strategy based on signals received from one or more sensors. A realizable combination of gear configurations determines a total number of ratio steps. Although various planetary and lay-shaft gear configurations are found in modern automatic transmissions, the basic principle of shift kinematics is similar.

During a typical synchronous upshift event from a lower gear configuration to a higher gear configuration, both the gear ratio (defined as automatic transmission input shaft speed/output shaft speed) and the torque ratio (defined as automatic transmission output shaft torque/input shaft torque) become lower. During the upshift event, a friction element (referred to as an off-going clutch (OGC)) associated with the lower gear configuration disengages while a different friction element (referred to as an on-coming clutch (OCC)) associated with a higher gear configuration engages.

Figure 1:
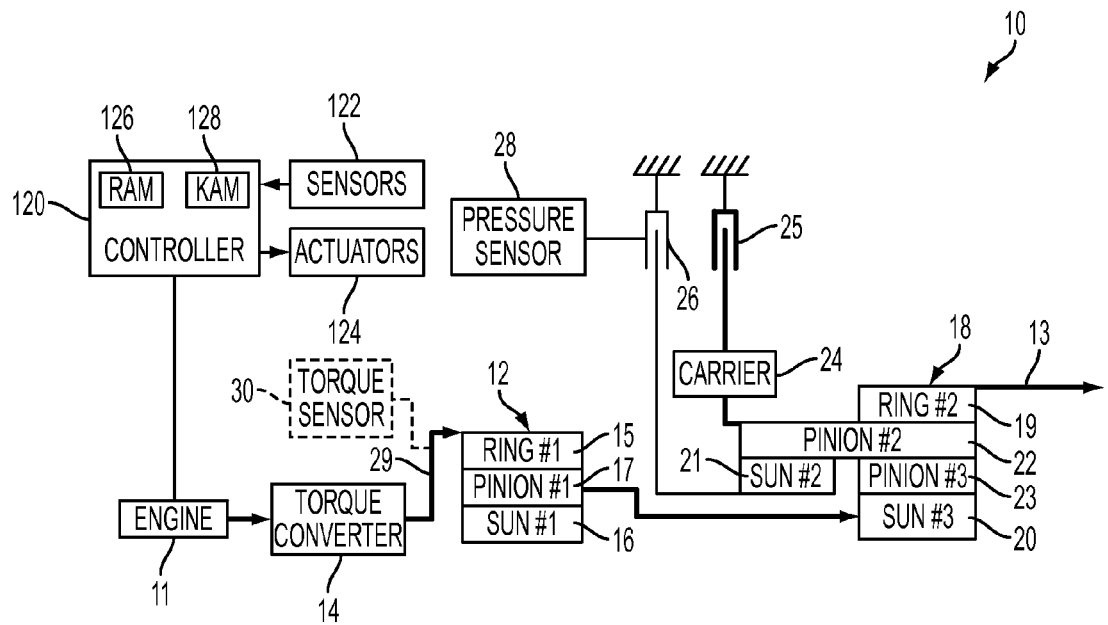
FIG. 1 illustrates a schematic representation of a multiple-ratio automatic transmission according to embodiments of the present disclosure in a low gear configuration.
Figure 2:
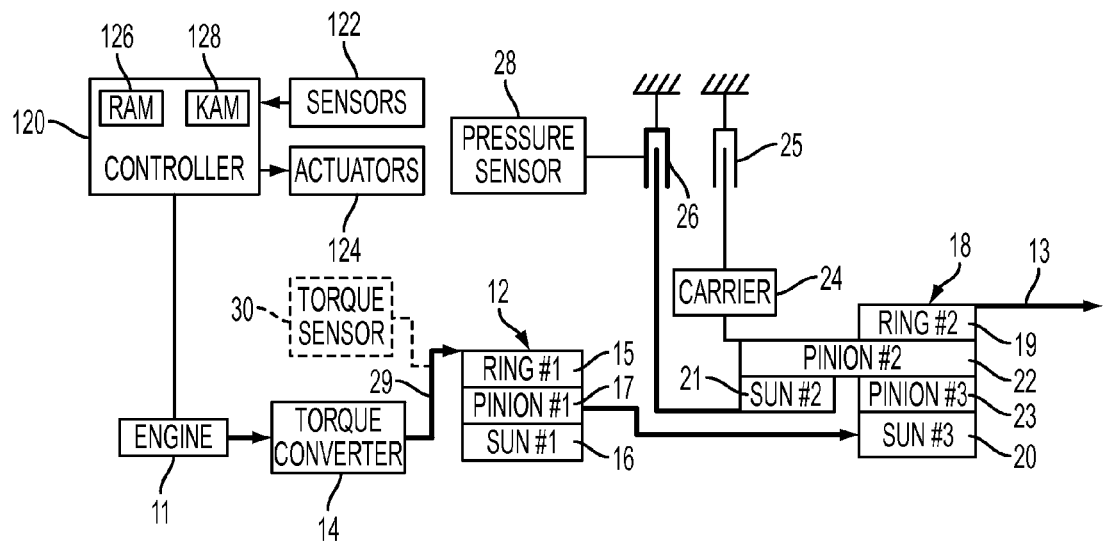
FIG. 2 illustrates a schematic representation of a multiple-ratio automatic transmission according to embodiments of the present disclosure in a high gear configuration.

Referring now to FIGS. 1 and 2, schematic representations of a multiple-gear automatic transmission for use in an automotive powertrain are shown. As explained in greater detail below, transmission 10 has a representative low gear configuration illustrated in FIG. 1 and a representative high gear configuration illustrated in FIG. 2.

Although the powertrain shown in FIGS. 1 and 2 includes a torque converter at the torque input side of transmission 10, various embodiments of the present disclosure can be used as well in a hybrid powertrain that includes, for example, an engine and an electric motor either with or without a torque converter. In a hybrid configuration, the power of the engine may be complemented by the power generated electrically by the motor. Further, the specific gearing arrangement illustrated in FIGS. 1 and 2 can be replaced by other gearing arrangements that establish multiple torque flow paths from a power source (e.g., engine and/or motor) to an output shaft.

The powertrain shown in FIGS. 1 and 2 includes an internal combustion engine 11 coupled to a simple planetary gear set 12 of a multiple ratio transmission 10 by a torque converter 14. The simple planetary gear set 12 includes ring gear 15, pinion gears 17 and sun gear 16. Torque is delivered by the torque converter to ring gear 15. Sun gear 16, which is grounded, acts as a reaction element as torque is delivered by a planetary carrier for pinion gears 17, which engage ring gear 15 and sun gear 16.

A compound planetary gear set 18 includes a ring gear 19, which is driveably connected to an output shaft 13. Sun gear 20 acts as a torque input element for compound planetary gear set 18. A second sun gear 21 engages long pinion gears 22, which in turn engage ring gear 19 and short pinion gears 23. Sun gear 20 also engages pinion gears 23. The pinion gears form a compound pinion gear assembly supported on carrier 24, which can be selectively braked by clutch 25 (i.e., OGC). Sun gear 21 can be selectively braked by clutch 26 (i.e., OCC).

A controller 120 may include various types of computer readable storage media to implement volatile and/or persistent memory. In the representative embodiment of FIGS. 1 and 2, controller 120 includes volatile random access memory (RAM) 126 and persistent keep-alive memory (KAM) 128. Various other types of memory or storage (not shown) may also be provided, such as read-only memory (ROM), for example. Controller 120 is in communication with one or more sensors 122 and actuators 124. Sensors 122 may include a pressure sensor 28, and various speed sensors (not shown) that provide signals indicative of rotational speed of associated components, such as speed of engine 11, input shaft 29, and output shaft 13, for example. Sensors 122 include a torque sensor 30 positioned to measure torque of input shaft 29. Torque sensor 30 may be implemented by a strain-gauge based system, a piezoelectric load cell, or a magneto-elastic torque sensor as described in greater detail in U.S. Pat. Nos. 6,266,054; 6,145,387; 6,047,605; 6,553,847; and 6,490,934, for example, the disclosures of which are incorporated by reference in their entirety. The magneto-elastic torque sensor enables accurate measurements of torque exerted onto a rotating shaft without requiring a physical contact between a magnetic flux sensing element and the shaft. It should be understood that the torque sensor can be positioned differently from that shown in FIGS. 1 and 2 depending on a kinematic arrangement and sensor packaging considerations for a given transmission system to implement upshift control methods according to various embodiments of the present disclosure.

Controller 120 may communicate with and/or control one or more torque sources or producers, such as engine 11. In hybrid vehicle applications, torque sources may also include a traction motor (not shown) in communication with and/or controlled by controller 120. Various control functions illustrated and described herein may be integrated within a single controller, or may be distributed between or among multiple special-purpose controllers, depending on the particular application and implementation.

Controller 120 is sometimes referred to as an engine control module (ECM), powertrain control module (PCM) or vehicle systems controller (VSC), for example, and generally includes a microprocessor in communication with computer readable storage media, represented by RAM 126 and KAM 128. The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the microprocessor to directly or indirectly control automatic transmission 10 and engine 11.

In one embodiment, the computer readable storage media include stored data representing instructions, software, or code executable by controller 120 to control upshifts of automatic transmission 10 using actuators 124 to engage and disengage one or more clutches or friction elements 25, 26 in response to signals from one or more sensors 122. In one embodiment, the control strategy implemented by the executable instructions or software controls engine torque to cause a measured transmission input shaft torque to achieve a target transmission input shaft torque during a shift event that includes a preparatory phase followed by a torque phase and an inertia phase. The measured transmission input shaft torque may be based on an input shaft torque signal produced by a torque input sensor coupled to an input shaft of the transmission as described in greater detail below.

As indicated, transmission 10 has a low gear configuration in FIG. 1 and a high gear configuration in FIG. 2. In the low gear configuration, OGC 25 acts as a reaction point for compound planetary gear set 18. The torque flow path in the powertrain is indicated in FIG. 1 by heavy directional lines. Torque is delivered during low gear operation from simple planetary gear set 12 to sun gear 20 of compound planetary gear set 18. Ring gear 19 delivers driving torque to output shaft 13.

During a synchronous upshift from the low gear configuration to the high gear configuration, OGC 25 is released and OCC 26 is engaged. At this time, sun gear 21 is braked by OCC 26. OCC 26 functions as a reaction point for compound planetary gear set 18. During this upshift from a low to high gear configuration, both the gear ratio and the torque ratio become lower.

In summary, FIG. 1 illustrates transmission 10 in a low gear configuration with high torque ratio. In the low gear configuration, OCC 26 (i.e., the high ratio clutch) is disengaged and OGC 25 (i.e., the low ratio clutch) is engaged. As a result, carrier 24 of pinion gears 22 of compound planetary gear set 18 is grounded, enabling torque transmission from sun gear 20 to output shaft 13 at a high torque ratio. FIG. 2 illustrates transmission 10 in a high gear configuration with low torque ratio. OCC 26 is engaged and OGC 25 is disengaged. As a result, sun gear 20 is grounded enabling torque transmission from sun gear 20 to output shaft 13 at low torque ratio. As shown in FIGS. 1 and 2, engine 11 is connected to transmission 10 by torque converter 14. Transmission 10 includes gear sets 12, 18 defining multiple torque flow paths from input shaft 29 to output shaft 13. As described in greater detail below, controller 120 controls engine torque to cause a measured transmission input shaft torque to approach a desired or target transmission input shaft torque during a shift event that includes a preparatory phase, a torque phase and an inertia phase.

Figure 3:
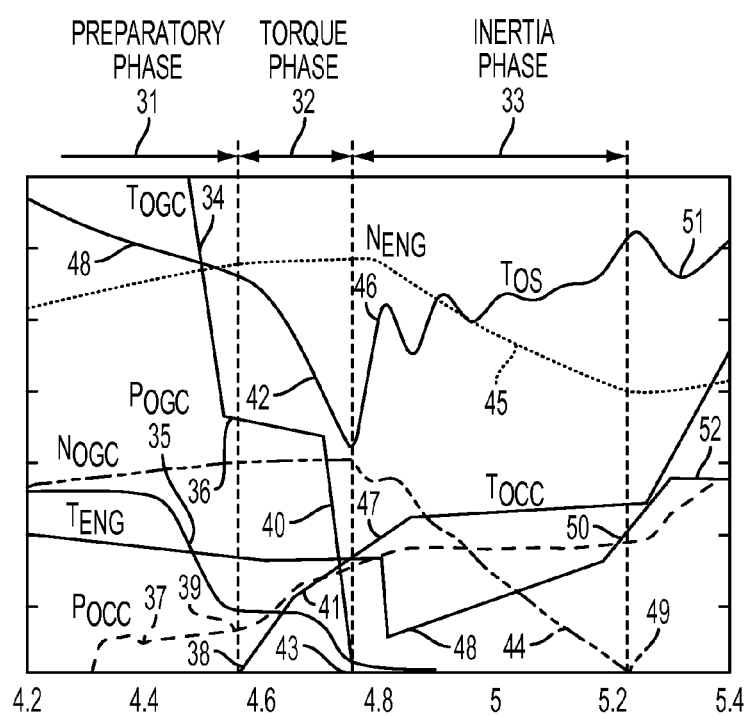
FIG. 3 illustrates a plot of a synchronous upshift event according to a prior art upshift control method for a conventional transmission.

Referring now to FIG. 3, a plot of a synchronous upshift event from the low gear configuration to the high gear configuration with a constant engine throttle setting according to a conventional upshift control method is shown. The variables plotted in FIG. 3 are characteristic of a conventional synchronous upshift control method. The prior art upshift control illustrated in FIG. 3 is described with respect to the schematic illustrations of a vehicle powertrain according to embodiments of the present disclosure illustrated in FIGS. 1 and 2.

The synchronous upshift event of FIG. 3 is divided into three phases: preparatory phase 31, torque phase 32, and inertia phase 33. Torque phase 32 is a time period when torque capacity of OGC 25 is controlled to decrease toward a value of zero for its disengagement. Preparatory phase 31 is a time period prior to torque phase 32. Inertia phase 33 is a time period when OGC 25 starts to slip, following torque phase 32. During preparatory phase 31, the torque capacity of OGC 25 is reduced, as shown at 34, by lowering hydraulic pressure ($P_{OGC}$) 35 applied to its actuator to prepare for its release. The OGC 25 maintains enough torque capacity, however, to keep it from slipping at this time, as shown at 36. Simultaneously, OCC 26 hydraulic control pressure ($P_{OCC}$) is increased at 37 to stroke OCC 26 actuator, without assuming a significant torque capacity, to prepare for its engagement.

The torque phase 32 begins at an initial rise time ($t_{OCC}$) 38 when OCC torque capacity ($T_{OCC}$) starts rising. At the initial rise time, the OCC actuator may still be squeezing oil film between clutch plates with no detectable change in $P_{OCC}$ profile 39. This is because OCC can develop significant torque through viscous shear between clutch plates even before its actuator is fully stroked. It is known that this viscous torque is highly nonlinear with respect to $P_{OCC}$ due to a number of factors, such as the frictional characteristics of the clutch plates and transmission fluid, temperature, etc. Accordingly, it is difficult to accurately detect $t_{OCC}$ based on the measurements of $P_{OCC}$. During the torque phase 32, $T_{OGC}$ is further reduced 40 without slipping, maintaining the planetary gear set in the low gear configuration. However, the increasing $T_{OCC}$ 41 reduces net torque flow within the gear set. As a result, the output shaft torque ($T_{OS}$) drops significantly during the torque phase, creating the so-called torque hole 42. A large torque hole can be perceived by a vehicle occupant as an unpleasant shift shock.

The torque phase ends, hence the inertia phase begins, when OGC starts slipping at 43 (OGC slip not shown in the figure). Note that OGC may be allowed to slip before $T_{OGC}$ reaches zero at 43 if the load exerted onto OGC exceeds its torque-holding capacity $T_{OGC}$. During the inertia phase 33, OGC slip speed rises while OCC slip speed decreases toward zero 44. The engine speed drops 45 as the planetary gear configuration changes. During the inertia phase 33, the output shaft torque is primarily affected by $T_{OCC}$. This causes output shaft torque to rapidly move to the level 46 that corresponds to $T_{OCC}$ 47 at the beginning of the inertia phase.

FIG. 3 also shows reduced engine torque ($T_{ENG}$) 48 during the inertia phase. This is due to engine torque truncation by means of engine spark timing control according to a common practice in the conventional shift control method, enabling OCC to engage within a target time without requiring excessive torque capacity. When OCC completes engagement or when its slip speed becomes zero 49, the inertia phase 33 ends. The engine torque truncation is removed 50 and $T_{OS}$ moves to the level 51 that corresponds to a given engine torque level 52.

Figure 4:
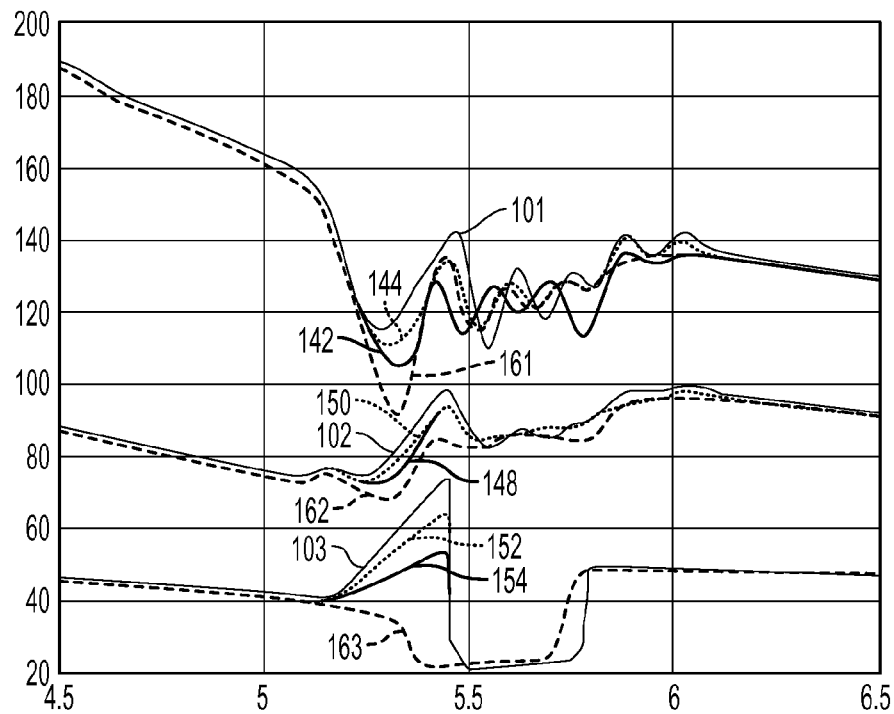
FIG. 4 illustrates the relationship between transmission output shaft torque, transmission input shaft torque and engine torque in accordance with embodiments of the present disclosure.

Referring now to FIG. 4, the relationship between transmission output shaft torque, transmission input shaft torque and engine torque according to embodiments of the present disclosure is shown with respect to the baseline behaviors (depicted in dashed lines 161, 162, 163) according to prior art upshift control. FIG. 4 illustrates that transmission output shaft torque levels 101, 142 and 144 vary with corresponding transmission input shaft torque levels 102, 148 and 150, respectively. Further, the transmission input shaft torque levels 102, 148 and 150 may be adjusted through control of corresponding engine torque levels 103, 154 and 152, respectively. Measured transmission input shaft torque levels may be determined using various methods, such as, but not limited to, an input shaft torque signal produced by an input shaft torque sensor. By controlling actual transmission input torque, output shaft torque disturbance perceived by vehicle occupants may be eliminated or substantially reduced.

Figure 5:
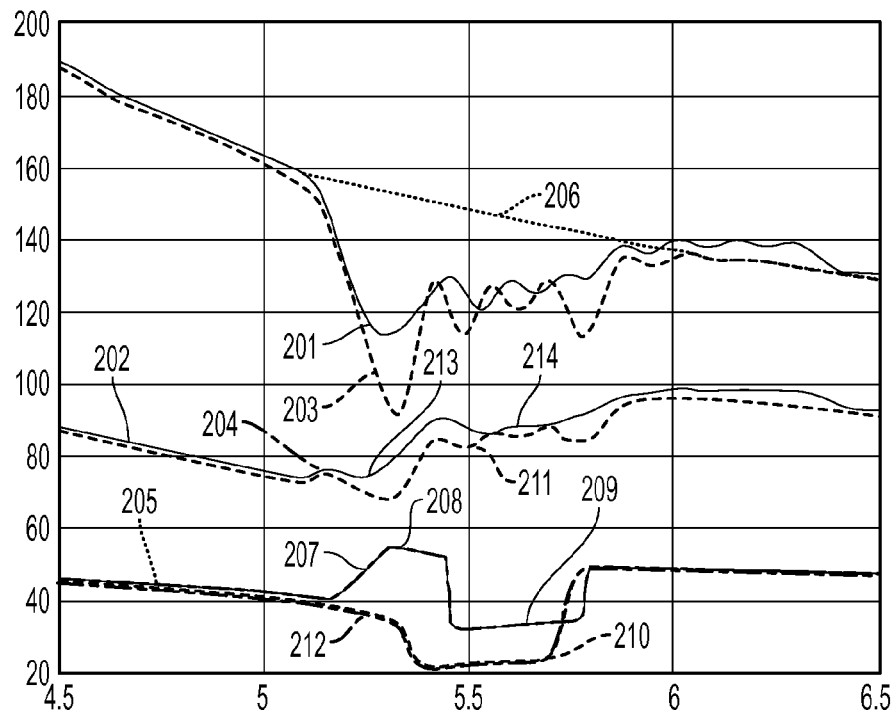
FIG. 5 illustrates a plot of reduced transmission output shaft torque disturbance in accordance with embodiments of the present disclosure.

Referring now to FIG. 5, a plot of reduced transmission output shaft torque disturbance in accordance with embodiments of the present disclosure is shown. Output shaft torque disturbance may be reduced through engine torque control. As shown in FIG. 5, output shaft torque 203 and corresponding engine torque profile 212 represent torque output without the use of engine control methods disclosed herein. Whereas, output shaft torque 201 and corresponding engine torque profile 207 represent torque output resulting from engine torque control using input shaft torque signal 202. The output shaft torque 201 using engine torque control 207 has a relatively small torque disturbance as compared to the output shaft torque 203 not using engine torque control.

Moreover, the start time of the torque transfer phase may be detected from a slope change or an upward blip 204 in input shaft torque signal 202. After detecting the start of the torque transfer phase, engine torque 205 is controlled using actual torque applied on the transmission input shaft measured from the input shaft torque signal 202, which may be produced by an input shaft torque sensor. A target input shaft torque profile may be calculated from a desired output shaft torque profile using speed ratio (input shaft speed/output shaft speed). In a preferred embodiment, desired output shaft torque would be a linear profile without fluctuation 206. However, in many applications, the desired output shaft torque may have a different shape to accomplish consistency of all shift events or compensate for different shift conditions, for example.

Engine torque 205 may be raised 207, during the torque transfer phase, to achieve a target level of input shaft torque 213. The engine torque 205 may be clipped 208 to avoid excessive input shaft torque possibly causing shuffle mode excitation or larger torque disturbance. Engine torque 205 can be adjusted 209 to achieve the target input shaft torque 214 during the inertia phase. Controlled engine torque 209 has a different shape and magnitude from engine torque 210, which does not use engine control methods as described in this disclosure, in order to achieve a desired input torque level. As a result, the input shaft torque signal 214 also shows a different shape compared to that of input shaft signal 211 produced during a conventional shift.

Figure 6:
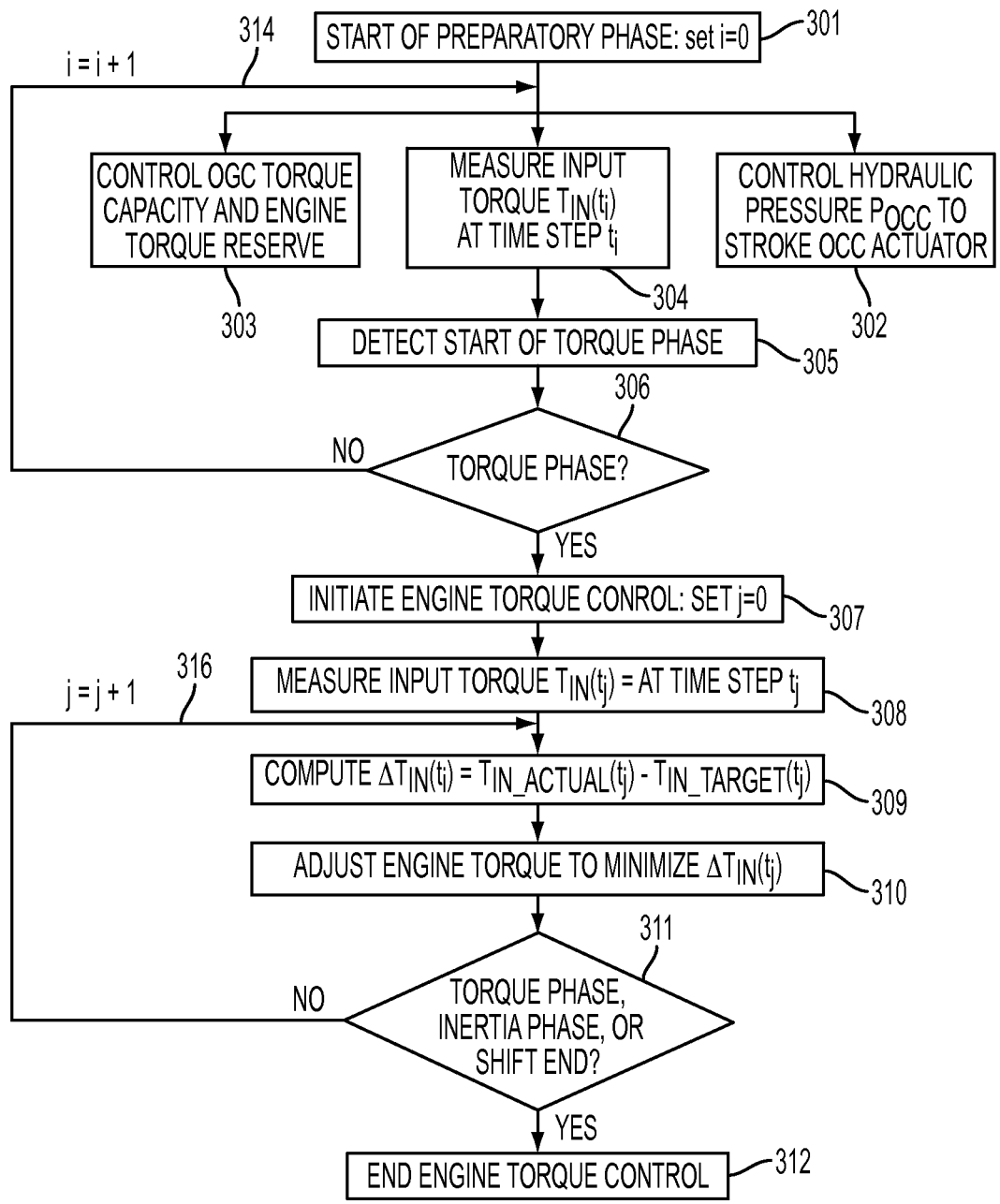
FIG. 6 illustrates a flowchart describing a control sequence operation of an upshift control system or method in accordance with an embodiment of the present disclosure.

Referring now to FIG. 6, a system and method for controlling engine torque to minimize torque disturbances according to an exemplary embodiment of the present disclosure is shown. As those of ordinary skill in the art will understand, the functions represented in FIG. 6 may be performed by software and/or hardware depending on the particular application and implementation. The various functions may be performed in an order or sequence other than illustrated in FIG. 6 depending upon the particular processing strategy, such as event-driven, interrupt-driven, etc. Similarly, one or more steps or functions may be repeatedly performed, performed in parallel, and/or omitted under particular operating conditions or in particular applications, although not explicitly illustrated. In one embodiment, the functions illustrated are primarily implemented by software, instructions, or code stored in a computer readable storage device and executed by one or more microprocessor-based computers or controllers to control operation of the vehicle.

More specifically, in FIG. 6, a powertrain controller initiates a shift event, which defines the start of the preparatory phase (i.e., setting i=0), as shown in block 301. The controller then prepares the OCC for engagement by raising hydraulic pressure to OCC actuator ($P_{occ}$), as shown in block 302, while reducing OGC torque capacity without slipping and adjusting engine torque reserve as shown in block 303. An input torque sensor then measures transmission input torque $T_{IN}(t_i)$ at control time step i or at time $t_i$, as shown in block 304, and the input torque sensor provides a corresponding input torque signal to the controller. At blocks 305 and 306, the controller determines the end of the preparatory phase and the start of the torque phase. The controller iterates the control loop beginning from block 306 as shown at 314 until the preparatory phase ends and the torque phase begins.

When the torque phase starts, the controller initiates engine torque control at block 307 (i.e., setting j=0) and measures the actual transmission input torque $T_{IN}(t_j)$ at control time step j or at time $t_j$ as shown in block 308. The controller then generates a target input shaft torque profile $T_{IN\_TARGET}$ based on a desired output shaft torque profile using a speed ratio (e.g., input shaft speed/output shaft speed). After generating the target input shaft torque profile, the controller computes the difference between the actual and target input shaft torque ($\Delta T_{IN}(t_j)$) at control time $t_j$ as shown in block 309. The controller further controls and/or compensates engine torque to reduce the difference between the actual and the target input shaft torque profiles, as shown in block 310. The controller iterates the control loop beginning from block 311 as shown at 316 until the torque phase, inertia phase and/or the shift event ends. When the torque phase, inertia phase and/or the shift event ends at block 311, the controller stops engine torque control for the shift event and goes back to normal operation as shown in block 312.

As such, embodiments according to the present disclosure reduce torque disturbances transmitted from the powertrain to the vehicle body, which reduces the unpleasant shift shock experienced by drivers. Use of the measured transmission input shaft torque signal facilitates coordinated torque phase control and inertia phase control of an on-coming clutch, off-going clutch, and input torque source(s) in a synchronized manner during shifting to improve shift quality and consistency.

It is to be understood that the invention is not limited to the exact shift control methods which have been illustrated and discussed in this disclosure, but that various modifications may be made without departing from the spirit and the scope of the invention. It is to be understood that the invented method may be combined with a conventional shift control method for adjusting OCC clutch control parameters during the preparatory phase through a closed-loop, an open-loop or an adaptive scheme for balancing the reduction of torque disturbances with desired shift quality and drivability targets.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure. While the best mode has been described in detail, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments discussed herein that are described as less desirable than other embodiments or prior art implementations with respect to one or more characteristics are not outside the scope of the disclosure and may be desirable for particular applications.

What is claimed is:

1. A method for controlling a vehicle having a transmission, comprising:
controlling engine torque to cause a measured transmission input shaft torque to achieve a target transmission input shaft torque during a transmission shift event.

2. The method of claim 1, wherein the measured transmission input shaft torque is based on an input shaft torque signal produced by a torque input sensor coupled to an input shaft of the transmission.

3. The method of claim 2, wherein the input torque sensor comprises at least one of a strain-gauge, a piezoelectric load cell, and a magneto-elastic torque sensor.

4. The method of claim 2 further comprising:
detecting a start of a torque phase of the transmission shift event;
controlling the engine torque during the torque phase using closed-loop control with feedback provided by the input shaft toque signal.

5. The method of claim 1, wherein the target transmission input shaft torque is based on a desired output shaft torque.

6. The method of claim 5, wherein the desired output shaft torque is calculated from an input shaft speed and an output shaft speed of the transmission.

7. The method of claim 5, wherein the desired output shaft torque is based on an accelerator pedal position.

8. The method of claim 5, wherein the desired output shaft torque is calculated from available engine torque reserve.

9. The method of claim 1, further comprising:
terminating transmission shift event engine torque control in response to end of the torque phase.

10. The method of claim 9, further comprising:
increasing hydraulic pressure of an on-coming clutch (OCC) during a preparatory phase of the transmission shift event;
reducing torque capacity of an off-going clutch (OGC) during the preparatory phase to prepare for disengagement of the OGC; and
increasing an engine torque reserve to a predetermined level during the preparatory phase.

11. The method of claim 10, wherein desired engine torque is based on a difference between the measured transmission input torque and the target transmission input torque.

12. A vehicle powertrain, comprising:
an engine;
a transmission having an input shaft coupled to the engine by a torque converter, the transmission having a gear set defining multiple torque flow paths from the input shaft to an output shaft of the transmission;
an input torque sensor coupled to the input shaft; and
a controller configured to control engine torque during a torque phase of a transmission shift event to cause a measured transmission input shaft torque to approach a target transmission input shaft torque during the shift event.

13. The vehicle powertrain of claim 12, wherein the target transmission input shaft torque is based on a desired output shaft torque.

14. The vehicle powertrain of claim 13, wherein the desired output shaft torque is calculated from an input shaft speed and an output shaft speed of the transmission.

15. The vehicle powertrain of claim 13, wherein the desired output shaft torque is based on an accelerator pedal position.

16. The vehicle powertrain of claim 13, wherein the desired output shaft torque is based on available engine torque reserve.

17. The vehicle powertrain of claim 12, wherein the measured transmission input shaft torque is based on an input shaft torque signal produced by the input torque sensor.

18. The vehicle powertrain of claim 12, wherein the input torque sensor comprises at least one of a strain-gauge, a piezoelectric load cell, and a magneto-elastic torque sensor.

19. The vehicle powertrain of claim 12, wherein the controller controls engine torque based on a difference between the measured transmission input torque and the target transmission input torque.

20. The vehicle powertrain of claim 12, wherein the controller is further configured, during the preparatory phase of the shift event, to control hydraulic pressure applied to an on-coming clutch (OCC) to prepare for engagement of the OCC, reduce torque capacity of an off-going clutch (OGC) to prepare for disengagement of the OGC and increase an engine torque reserve to a predetermined level.

* * * * *